P. C. HEWITT.
ELECTRODE FOR VAPOR LAMPS.
APPLICATION FILED APR. 16, 1904.
965,900.
Patented Aug. 2, 1910.
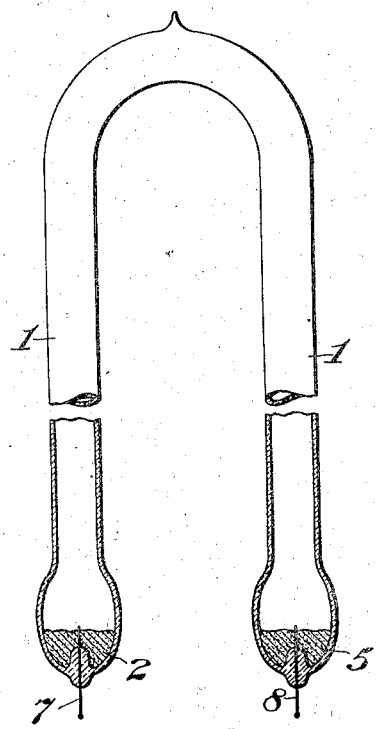
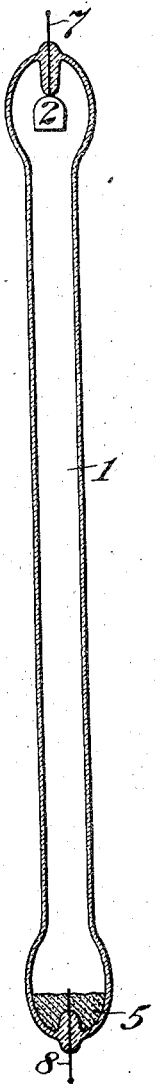

UNITED STATES PATENT OFFICE.

PETER COOPER HEWITT, OF NEW YORK, N. Y., ASSIGNOR TO COOPER HEWITT ELECTRIC COMPANY, OF NEW YORK, N. Y., A CORPORATION OF NEW YORK.

ELECTRODE FOR VAPOR-LAMPS.

965,900.  Specification of Letters Patent.  Patented Aug. 2, 1910.

Application filed April 16, 1904. Serial No. 203,435.

*To all whom it may concern:*

Be it known that I, PETER COOPER HEWITT, a citizen of the United States, and a resident of New York, in the county of New York and State of New York, have invented certain new and useful Improvements in Electrodes for Vapor-Lamps, of which the following is a specification.

In a number of United States patents issued to me on the 17th day of September, 1901, I have shown and described electric lamps comprising, generally, a glass container and electrodes within the same, one of the electrodes being in many instances a mass or puddle of mercury. The other electrode in lamps of this class may be either a body of solid material or it may be of mercury. In order to facilitate the transportation of these lamps without any unnecessary liability to breakage, I have devised as a substitute for one or both of the mercury electrodes, an electrode which is solid at normal temperatures, such solid electrode consisting of a suitable amalgam adapted to become more or less fluid when the lamp is in operation. I may employ two amalgam electrodes or a single amalgam electrode in combination with an electrode which remains solid, and in either case the lamp containing such electrodes can be readily transported without the danger, which might otherwise exist, of being broken by the shock of the moving mercury in case the lamp should be inverted in transportation. An electrode which I have found suitable for the purpose described is formed by making an amalgam of one part of lead, one of tin, and four of mercury. The electrode thus constituted volatilizes with sufficient ease and rapidity to serve the purposes of the lamp and at the same time possesses the advantages set forth above. These proportions may be varied or other mixtures may be used to suit specific cases.

I have illustrated my invention in the accompanying drawing in which—

Figure 1 is a vertical section of one of my lamps having two amalgam electrodes; and Fig. 2 is a similar view of one of my lamps containing an anode of pure iron and an amalgam cathode.

In the drawing, 1 is a tube or container of glass and 2 and 5 are respectively, the anode and cathode of the lamp. Leading-in wires, 7 and 8, connect, respectively, with the anode and cathode and are properly joined to the working circuit.

In Fig. 1, both the anode 2 and the cathode 5, are made up of an amalgam say of four parts mercury; one part lead; and one part tin; while in Fig. 2, the anode 2 is of pure iron and the cathode may be an amalgam such as just described. The proportions given are such as I have found well adapted to serve the purposes indicated. I desire, however, that these proportions may be considerably varied in practice as I do not wish to be limited to the exact proportions named, or the specific metals indicated as, cadmium, silver or other metals may be used to solidify or soak up the mercury.

In case of silver, it will soak up like a sponge, but always remain hard, not liquid.

I claim as my invention:

An electrode for mercury vapor apparatus, consisting of an amalgam formed of lead, tin and mercury in approximately the proportions of one part lead, one part tin, and four parts mercury.

Signed at New York, in the county of New York and State of New York, this 11th day of April, A. D. 1904.

PETER COOPER HEWITT.

Witnesses:
 R. A. HEWITT,
 WM. H. CAPEL.